United States Patent
Mhatre et al.

(10) Patent No.: US 8,112,309 B1
(45) Date of Patent: Feb. 7, 2012

(54) MERCHANT AND CUSTOMER INTERACTION SYSTEM USING SHORT MESSAGE SERVICE FOR CUSTOMER REWARDS

(76) Inventors: Pankaj Mhatre, Santa Clara, CA (US); Ali Barekat, San Jose, CA (US)

( * ) Notice: Subject to any disclaimer, the term of this patent is extended or adjusted under 35 U.S.C. 154(b) by 1034 days.

(21) Appl. No.: 11/972,391

(22) Filed: Jan. 10, 2008

Related U.S. Application Data

(60) Provisional application No. 60/884,384, filed on Jan. 10, 2007.

(51) Int. Cl.
*G06Q 40/00* (2012.01)

(52) U.S. Cl. .................. 705/14.1; 705/14.13; 705/14.36

(58) Field of Classification Search .................. 705/14, 705/14.1, 14.13, 14.36
See application file for complete search history.

(56) References Cited

U.S. PATENT DOCUMENTS

| | | | |
|---|---|---|---|
| 2006/0167753 A1* | 7/2006 | Teague et al. ................... | 705/14 |
| 2007/0100691 A1* | 5/2007 | Patterson ................... | 705/14 |
| 2007/0156517 A1* | 7/2007 | Kaplan et al. ................... | 705/14 |
| 2007/0156579 A1* | 7/2007 | Manesh ........................... | 705/39 |
| 2007/0265921 A1* | 11/2007 | Rempe et al. ................... | 705/14 |
| 2007/0293247 A1* | 12/2007 | Bhat et al. ..................... | 455/466 |
| 2008/0120179 A1* | 5/2008 | Wheeler et al. ................. | 705/14 |
| 2008/0133350 A1* | 6/2008 | White et al. ................... | 705/14 |
| 2009/0150218 A1* | 6/2009 | Brunner et al. ................. | 705/10 |
| 2010/0076845 A1* | 3/2010 | Ramer et al. ............... | 705/14.52 |

* cited by examiner

*Primary Examiner* — Jagdish Patel
*Assistant Examiner* — Kevin Poe
(74) *Attorney, Agent, or Firm* — Stanley J. Gradisar Attorney At Law LLC; Stanley J. Gradisar

(57) ABSTRACT

A system and a method are disclosed for providing rewards to consumers using short message service (SMS). The system receives a text message from a consumer containing a reward keyword and a reward code and determines whether the message is a qualifying message. After receiving a certain number of qualifying messages, the system sends a reward message to the consumer enabling the consumer to receive a reward. Rewards can be based on customer referrals or merchant loyalty.

24 Claims, 6 Drawing Sheets

MERCHANT AND CUSTOMER INTERACTION SYSTEM USING SHORT MESSAGE SERVICE FOR CUSTOMER REWARDS

CROSS REFERENCE TO RELATED APPLICATIONS

This application claims the benefit of U.S. Provisional Application No. 60/884,384, filed Jan. 10, 2007, which is incorporated by reference in its entirety.

This application, is related to U.S. patent application Ser. No. 11/972,249, filed on the same date as the present application, for "Merchant and Customer Interaction System Using Short Message Service for Demand Aggregation".

This application is related to U.S. patent application Ser. No. 11/972,383, filed on the same date as the present application, for "Merchant and Customer Interaction System Using Short Message Service for Customer Rewards".

BACKGROUND

1. Field of Art

The present invention relates to the field of mobile communications and more specifically to using mobile text messaging for interaction between merchants and customers or potential customers of a business.

2. Description of the Related Art

In commerce, merchants seek to maintain contact with their frequently visiting customers because such customers drive sales. In many instances merchants drive revenue higher by encouraging existing customers to visit and shop with them more often. In order to drive their existing customers to their location, merchants use several techniques. For example, some merchants encourage customers to drop their visiting or business cards at the store. Merchants could then build lists using these visiting or business cards to maintain a list of loyal customers and push promotions to them. A problem with this approach is that merchants do not have real-time interaction with their customers and must expend time and money resources to enter in the received data on the visiting or business cards. Moreover, such approaches are prone to data entry errors due to their highly manual process.

Other approaches to help drive traffic to merchant stores revolve around processes that induce customers to receive emails of offers, promotions, events and the like. However, these processes require that the user volunteer and share their email with the merchant or an agent for the merchant, which often leads to privacy concerns on the part of the customer. Moreover, email systems generally are not real time, and thus, the opportunity to immediately interact with a customer often is a lost opportunity for the merchant.

Thus, the present state of the art lacks, inter alia, a system and process for immediate electronic communication between a merchant and a customer that allows for a customer to immediately opt-in to receive additional opportunities for commerce related interactions with a merchant.

SUMMARY

One embodiment of a disclosed system (and method) includes enabling 2-way mobile interactions between merchants and customers using text messaging (short message service (SMS) messaging). The system supports an SMS text keyword (or keywords) per merchant, which consumers can text to an SMS short code expressing a particular intent. The merchant's account on the system can then respond with specific information back to consumers depending on rules defined on the system for each word or sequence of words being sent in the SMS message.

The disclosed embodiments beneficially allow for interactions between merchants and customers using SMS. With SMS, merchants can easily and rapidly send targeted messages to customers and customers can easily and rapidly provide information useful to merchants. The system enables automated SMS communications with clients and can be configured by merchants through a standard web browser. The system can provide automatic responses to customers who send text messages expressing interest in a merchant, brand, or segment. The system can provide a merchant with an indication of the demand associated with the merchant or a brand of the merchant. The system can also automatically respond to customers who send text messages referring other consumers to a merchant or customers who send text messages regarding products the customers have purchased from a merchant. As a result, merchants can maintain contact with frequent customers and encourage customer loyalty and referrals using an automated system and the immediate interactivity of text messaging.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Network Architecture Overview

Figure 1:
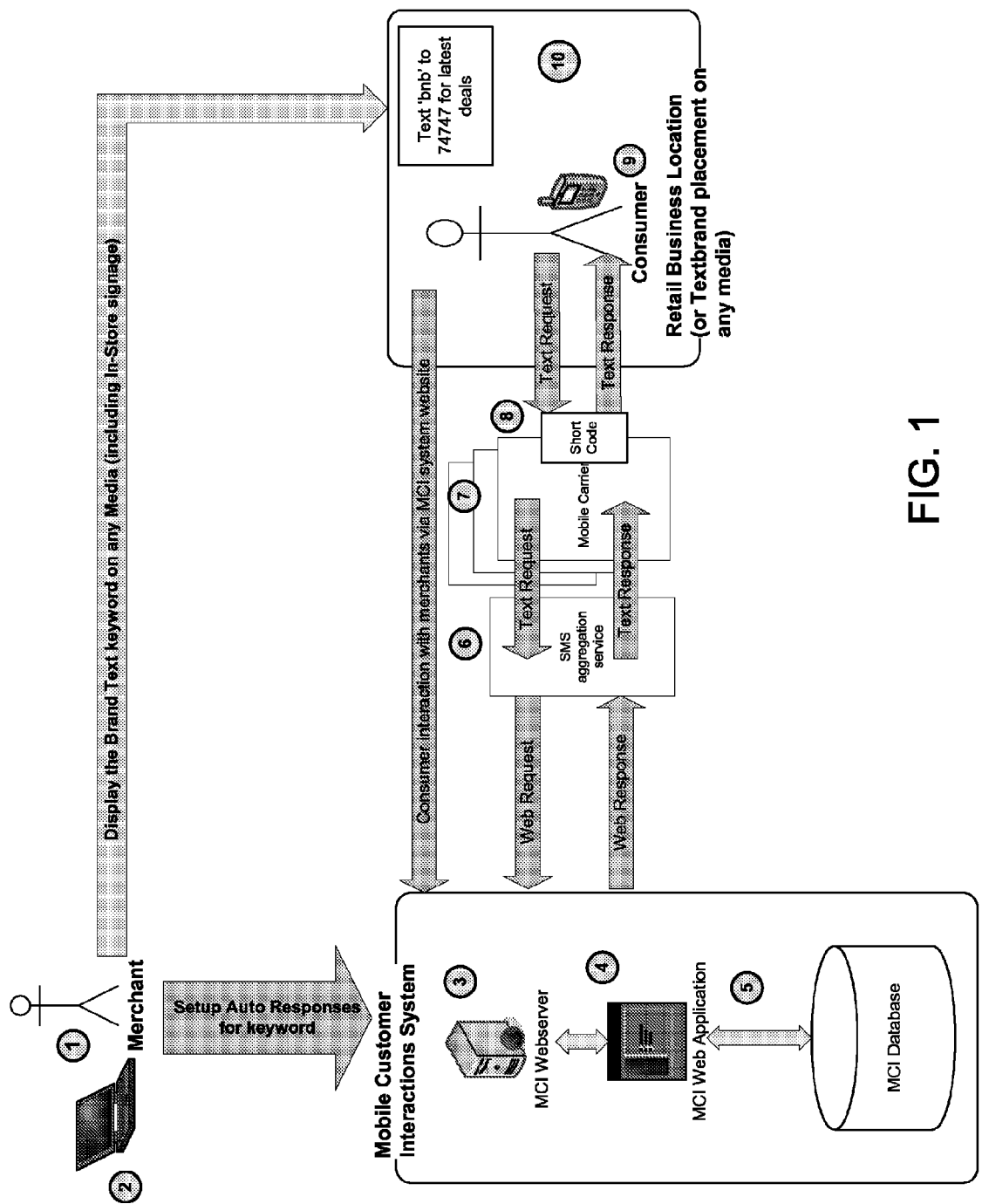
FIG. 1 illustrates one embodiment of a mobile customer interaction system with interactions between merchants and consumers.

FIG. 1 illustrates one embodiment of an example mobile customer interactions network architecture with interactions between merchants and consumers. The network architecture includes a merchant 1 and merchant system 2, a mobile customer interactions (or MCI) system, a short message service (SMS) aggregation service 6, one or more mobile carriers 7, a short code module 8, and consumer mobile communication device 9, e.g., a mobile phone or mobile text device.

The mobile customers interactions system includes a web server (or web server) 3, a web application 4, and a database 5. The web server 3 communicatively couples (or interacts with) the web application 4. The web server 3 and the web application 4 communicatively couple with the database 5. The web server 3 is a conventional web server configured to interface with a network, e.g., the Internet, and is accessible through the network. The web application 4 is a conventional web application configured to provide an interface for the merchant 1 to interact with the mobile customer interactions system and configured to process web and text message requests from the consumer 9 and provide web and text message responses to the consumer 9. In the description below, consumers are sometimes referred to as customers. The web application 4 may be created using various different platforms such as Ruby on Rails, Java application servers etc.

The merchant 1 in this example is part of the merchant customer interactions merchant network. In some instances, references to the merchant 1 is in the context of a merchant system (e.g., merchant computing system 2), but for ease of discussion will be referenced as simply merchant 1. Through the merchant computing system 2, the merchant 1 sets up an account within the merchant customer interactions network and creates a unique keyword called a "brand text keyword" that is stored in the database 5 of the mobile customer interaction system. The brand text keyword is a unique keyword within the mobile customer interaction system that identifies a store or a business on the mobile customer interaction text messaging system. Consumers (or users) 9 of the service can send the keyword as part of a text message to a short code module 8 and get a corresponding response message back if so configured by the store. The short code module 8 is configured to receive short message service (SMS) short codes. The short code is a short phone number (5 or 6 digit) that can receive text messages from consumer mobile phones across multiple mobile phone carriers. The short code is assigned by the Common Short Code Administration (CSCA) within the US.

The mobile customer interactions system is communicatively coupled with a mobile short message service (or SMS) aggregation service 6 that supports multiple mobile carriers 7, e.g., AT&T WIRELESS, VERIZON WIRELESS, or SPRINT PCS. The mobile SMS aggregation system 6 enables the mobile customer interactions system to receive text messages that are sent by consumers, e.g., through a consumer mobile phone 9. The consumer text message is relayed as a web request by the mobile carrier 7 to the SMS aggregation service 6 and onto the web application of the mobile customer interactions system. The mobile customer interactions system can respond back to the consumer mobile phone 9 with a text message that gets relayed by the SMS aggregation service and the carriers.

By way of example, the mobile customer interactions network architecture can be configured so that the merchant 1 through the merchant system 2 logs onto the mobile customer interactions web server 3 to sets up in the mobile customer interactions application 4 one or more auto responses for a particular brand-text keyword. The responses for the particular keyword are stored in the mobile customer interactions database 5.

Continuing, the merchant 1 through the merchant system 2, displays the brand text keyword on any media 10, for example, a store sign or display or a web site. An example of a text for display may read "Text 'bnb' to 74747 for the latest deals!" The customer reads the message and enters the brand-text keyword 'bnb' in their mobile phone 9. The customer transmits the text request with the short code 74747 to the short code module 9 that a mobile carrier 7 picks up and sends to the SMS aggregation service 6. The SMS aggregation service 6 sends the text message as a web request to the mobile customer interactions web server 3. The mobile customer interactions application 4 retrieves the response for the brand text keyword 'bnb'. For example, the response may be "save $5 off purchases of $25 or more until 9 PM tonight." The mobile customer interactions web server 3 transmits the response as a web response to the SMS aggregation service 6. The SMS aggregation service 6 generates a text response that is sent through the mobile carrier 7 and short code module 8 back to the mobile phone 9. The consumer can read the response ("save $5 off purchases of $25 or more until 9 PM tonight") on a screen of the mobile phone 9. It is noted that the generated response shown on the screen of the mobile phone can be configured to provide additional functionality, for example, a one-time special offer or coupon that includes a code to enter in at a point-of-sale terminal through which the transaction is closed.

Auto Response to Brand Text Keyword

Figure 2:
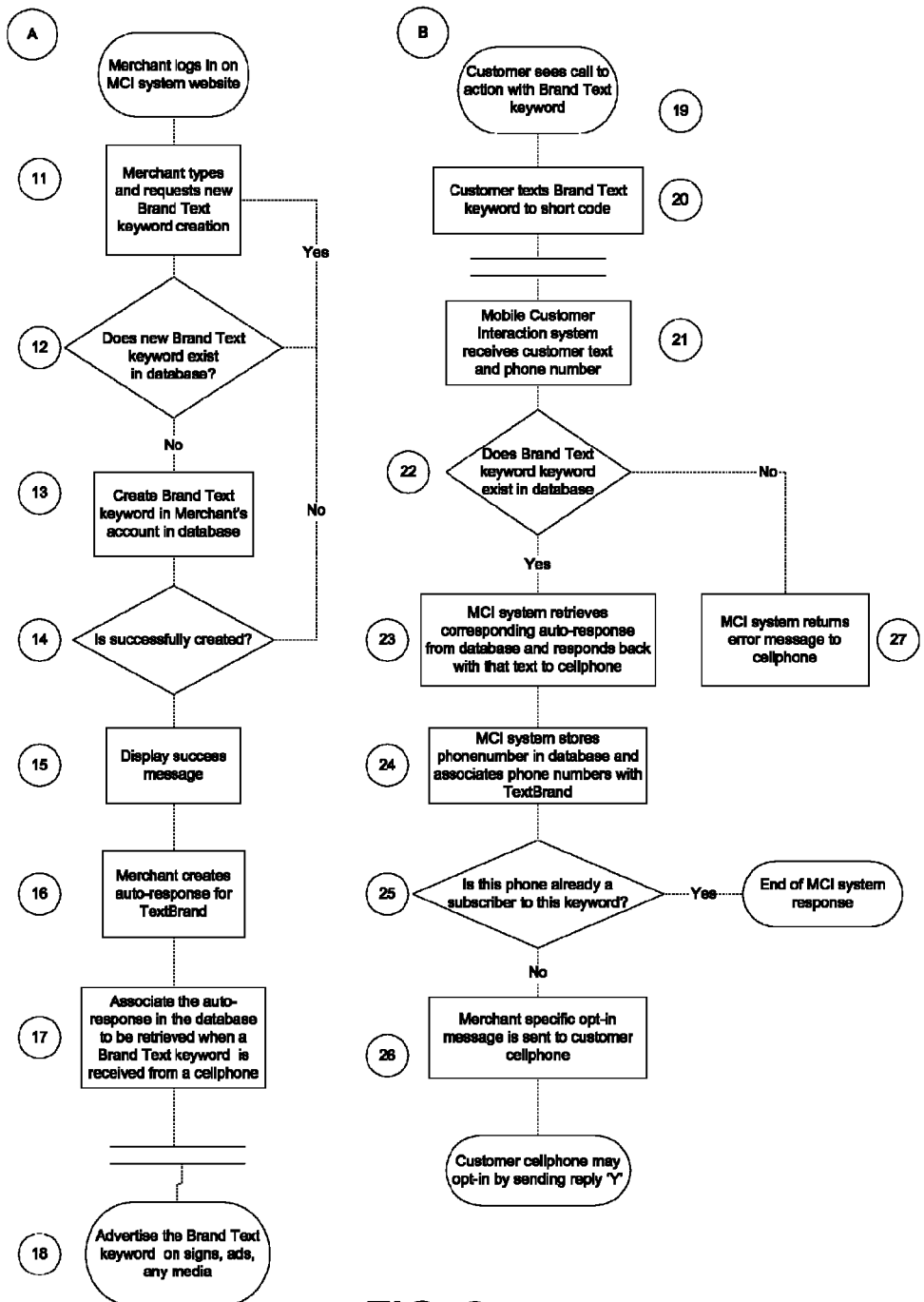
FIGS. 2a and 2b illustrates one embodiment of a process for creating auto response text messages to brand text keywords on a web site, e.g., a mobile customer interaction website and a process for sending an auto response to a consumer in response to receiving brand text keywords.

FIGS. 2a and 2b illustrates one embodiment of a process for creating auto response text messages to brand text keywords on a web site, e.g., a mobile customer interaction website and a process for sending an auto response to a consumer in response to receiving brand text keywords. Referring first to FIG. 2a, a flowchart illustrates one embodiment for a process of generating an auto response to a brand text keyword in a mobile customer interactions system. In this process a merchant 1 through the merchant system 2 logs on to the mobile customer interactions web server 3 and accesses the mobile customer interactions application 4. The application 4 is a self service application that is accessible through a conventional web browser connected to the Internet and is configured to allow the merchant 1 to setup brand text keywords and automatic text responses for each such keyword (or sub-keywords).

As noted previously, a brand text keyword is a unique keyword within the mobile customer interaction system that identifies a store or a business on the mobile customer interaction text messaging network. Users of the service can send the keyword as part of a text message to Short code and get a corresponding response message back as setup by the store on the website of the system. A brand text sub-keyword adds additional keywords after the keyword. Each sub-keyword can express a different action or intent and the consumer would get a different specific response defined for each sub text brand which can be different from the response of the main (or primary) brand text keyword. There can be more than just one sub-keyword after the keyword. Each additional sub-keyword is further segmenting (or creating a sub-segment of) the set of consumers addressed by the earlier keyword/sub-keyword sequence.

To create a brand text keyword, the merchant 1 through the merchant system 2 types 11 the word to request as a keyword, which will be the keyword consumer can text to the system. The mobile consumer interactions system checks the database 5 to determine 12 whether the keyword already exists. If the keyword is already in the database 5, it is not unique and the process queries the merchant 1 to type (or enter) 11 in a new keyword. If the keyword is not 12 in the database 5, it is considered unique and the system creates 13 a brand text keyword in the database 5 that is associated with an account for the merchant 1. The system determines 14 if there is a problem with creating the keyword and/or the association, e.g., verification of the merchant and account financial status. If there are problems the system may not create the brand text keyword and may return to the merchant system 2 reasons why and may ask for entry (or typing) of a new brand text keyword.

If the system successfully creates the brand text keyword, the system displays 15 a web page (or webpage) on the merchant system 2 for the merchant 1 to view. The web page includes one or more data entry fields into which the merchant 1 can create 16 one or more potential auto text responses to the specific brand text keyword. In one embodiment, when creating this auto-response, the first part of the text response is prepopulated with the commerce (e.g., retail or service store) name, location, and phone number so consumers can identify which specific merchant sent a message. The merchant can type in the rest of the text. In one embodiment, the text entry may be limited to a predetermined number of characters, e.g., 160 characters, which may correspond to the maximum length of a single text message. In addition, it is noted that the auto-response also may be more than a single text message. The system then associates 17 the created auto response with the brand text keyword in the database 5. The merchant 1 may then advertise 18 the created keyword to customers and potential customers via any media, for example, through print media, electronic media, rich media (e.g., TV or radio), and the like.

Referring next to FIG. 2b, a flowchart illustrates one embodiment of a process for returning an auto response in response to receiving a brand text keyword from a consumer, e.g., through a mobile phone 9. In this example process, a consumer may see (or view) 19 a display, e.g., print or web advertisement, from the merchant that includes an indication of the brand text keyword and short code. The consumer sends 20 a text message with the specified brand text keyword or sequence of keywords (unique to a merchant) to the designated short code, e.g., text 'bnb' to 74747.

The message from the consumer is transmitted through short code module, 8, mobile carrier 7, and SMS aggregator 6 and received 21 by the mobile customer interactions web server 3 through a web interface communicatively coupled with the SMS aggregator 6. The mobile consumer interactions application 4 obtains the brand text keyword from the web server 3 and determines 22 if the brand text keyword exists in the database 5. Specifically, the application 4 extracts the first word in the text message to check if it matches any particular merchant text brand existing in the system database.

If no match is found by the application 4, the auto response transmits 27 back a message to the consumer mobile phone 9 noting no match and optionally may include a message requesting re-typing in the text message and short code. If the brand text keyword matches, the rest of the message is matched to other sub-keywords for the merchant. The application 4 retrieves 23 from the database 5, the latest autoresponse associated with the matched brand text keyword and transmits it back to the consumer mobile phone 9.

In one embodiment, the mobile customer interactions application 4 is configured to at least temporarily store 24 the mobile phone number and associate the mobile phone number with the brand text keyword. If the application 4 determines 25 that the mobile phone number is not a subscriber to the particular brand text keyword, a message requesting 26 opt in to become a subscriber is transmitted to the customer. If the application 4 receives back an affirmative response, e.g. 'yes' or 'Y', to opt in, the application stores the mobile phone number long term in the database 5 and associates it with the brand text keyword. If an affirmative response is not received by the application 4, the phone number is deleted from the database 5. The stored phone number can be used by the merchant to send messages to the phone. The phone number can also be used to associate data gathered from a subscriber with a particular profile.

Segmentation of Customer Subscribers

On the mobile customer interactions system, merchants may define additional words that a customer may append to a main brand text keyword to form an extended text message string that may be transmitted (or "texted"). These additional words were previously described as brand text sub-keywords. The brand text sub-keyword may include one or more levels or layers, e.g., more than one word could be appended to the main brand text keyword. The brand text sub-keywords provide additional levels of data that allow for parsing customers and preferences into more detailed categories, e.g., segments, which beneficially allow for more focused targeting for marketability purposes.

By way of illustrative example, a consumer may walk into a merchant location (e.g., store), view a specific brand text keyword to send as a SMS text message to a SMS short code. One response back to the brand text keyword may be a SMS coupon with a validity period. The coupon can be generated depending on different types of rules associated with them such as time of request, referral, some measure of loyalty, and the like. Another response may be a SMS message showing how to opt-in to receive any further marketing communications on text messaging. The further marketing communications may include coupons, special deals which are period specific and advertisements, and the like. Once consumers are opted-in, then merchants can send SMS messages to those specific customers.

Next, the messages from any opt-in can be specifically targeted for specific consumer (or customer) types/segments. As previously note, similar to brand text keywords, a Sub-Keyword, can be an additional word that gets texted (sent as SMS) to a Short Code after the Brand Text keyword. For example, a consumer may be asked to text to: 74747 a message "pizzahut veggie". Here, the brand text keyword is "pizzahut" and the sub keyword is "veggie." The sub keyword can be used to determine "intentions" of the consumer. For example, it can be construed as expression of interest in a specific category of product or service being offered by the merchant owning the main Brand Text keyword. The opt-in permission from the customer is for the main brand text keyword, and therefore, overarching, across all the texting of that brand text keyword, regardless of the sub-keywords sent via text. However, the transmitting a brand text sub-keyword can be used as the 'segmentation' criteria for segmenting the subscribers to a brand text keyword and targeting relevant messages to just the specific phones that texted the brand text sub-keyword.

For example, if a consumer texts 'coolclub jazz' to find the upcoming jazz nights at 'Cool Club' and then opts-in, the opt-in is considered for 'coolclub' itself, so that the consumer can receive any messages related to 'Cool Club.' However, the system knows which of the subscribers texted 'coolclub jazz' and can choose to send jazz related messages to only these subscribers rather than all 'Cool Club' subscribers.

Additional "tags" can be defined by a merchant. The tags may be referenced as "segment tags" and are internal to the mobile customer interaction system and not visible to the customer. For example, if text "win" is for young women's jeans, the consumers text only the word "win" to 74747 but the tags in the system for that particular contest could tag these customers with "young women" and "jeans" tags. There could be other text keywords created in the future that might have the same "young women" tag. The next time customers have to be targeted as segments, the tag "young women" would be used to retrieve the specific consumers that participated in both the texts. These "segment tags" could also be associated with any promotion after the promotion has finished, e.g., all phone numbers that participated get "tagged" as being part of that segment.

Thus, in the example provided the system can be configured to allow consumers to express intention by sending specific keywords over SMS; use the keywords to segment customers according to interests/intentions; get consumers to subscribe to text messages from merchants about the specific interests; have merchants send specific text messages relating to the specific interests, e.g., target specific segments of a text message list of subscribers with specific information including deals, discounts and the like; and send a link to a specific web page in the message. Once the particular segments of interest for a consumer are known, the auto-response to consumers can be different depending on their particular segments.

Figure 3:
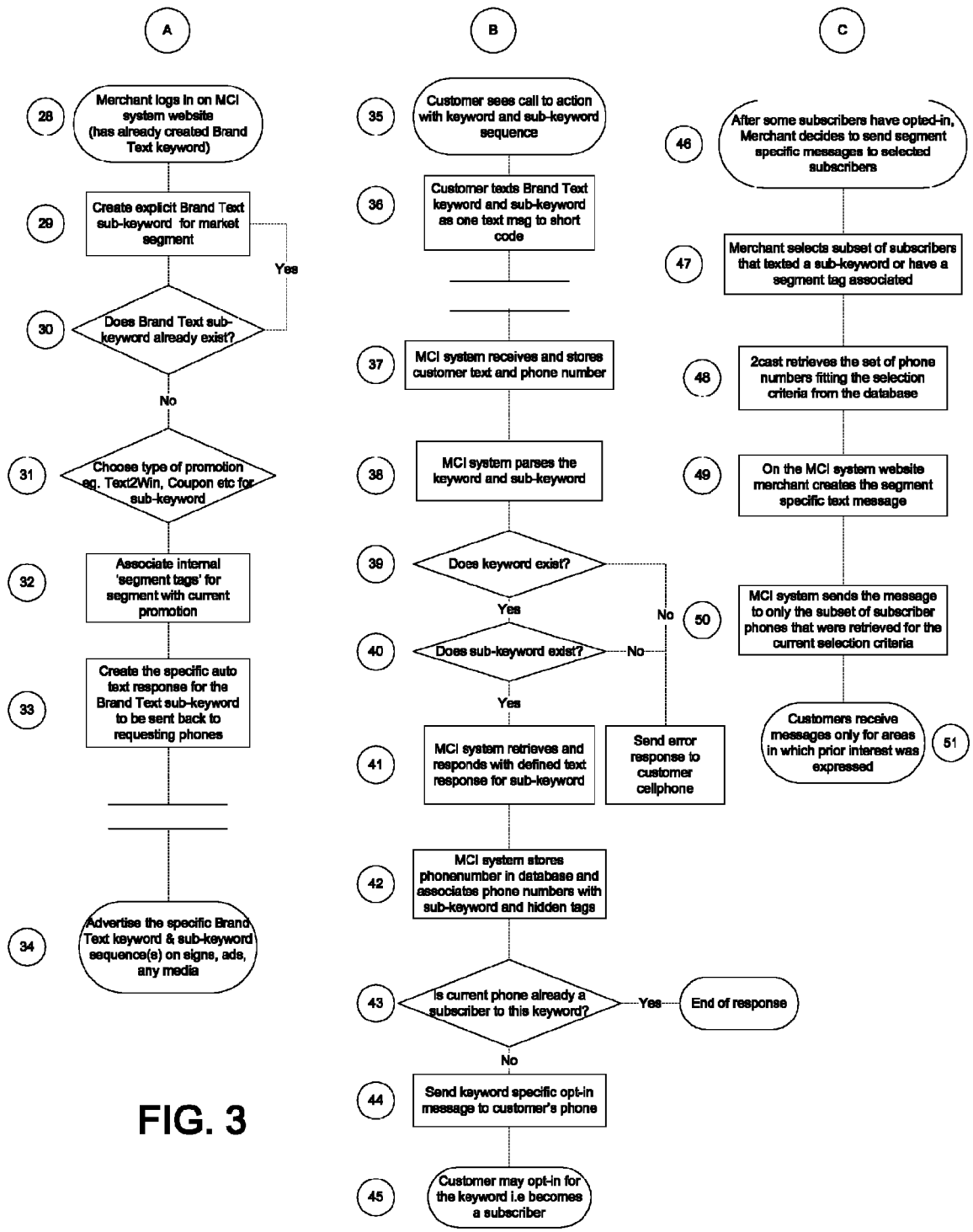
FIGS. 3a through 3c are flowcharts illustrating one embodiment of a process for creating segment specific auto-responses, receiving customer brand text keywords and brand text sub-keywords, and transmitting segment specific message to targeted customers.

FIGS. 3a through 3c are flowcharts that illustrate one embodiment of a process for creating segment specific auto-responses, receiving customer brand text keywords and brand text sub-keywords, and transmitting segment specific message to targeted customers. Referring first to the creation of segment specific auto responses in FIG. 3a, it is noted that segment targeting can be explicit or implicit. Explicit targeting is when the actual words the consumer used in the SMS requests are themselves used as segmentation criteria when sending messages to the same consumer mobile phone at a later time. Implicit targeting is when the SMS words sent by the consumers had internal "segment tags" associated at the server side (on the system) and those system stored tags are later used to segment the consumers and send messages to the consumers at a future time.

In the mobile customer interactions system, as noted previously, the merchant 1 can define any number of brand text keywords and further levels down (or sub keywords). In this example process, the process starts with the merchant 1 logging into 28 the mobile consumer interactions web server 3 in which a keyword was created and approved for the merchant 1. The mobile consumer interactions application 4 allows the merchant to create 29 an explicit brand text sub keyword for a market segment. The application 4 determines 30 if the sub-keyword exists and if so, asks the merchant 1 to try another sub-keyword. If the sub-keyword does not exist, the application 4 request a selection (or choice) 31 from the merchant on type of promotion, e.g., a Text2Win promotion, a coupon promotion, or the like. Once the selection is received, the sub keyword and promotion selection is stored in the database 5. In addition, the application associates 32 the promotion with a segment tag for the market segment in the database 5. As part of each brand text sub-keyword's creation process, the merchant 1 can create 33 (or define) the auto-response that the customer mobile phone will receive when the sub-keyword is received via text message from the mobile phone 9. The merchant can advertise 34 the specific Brand Text keyword and sub-keyword sequence(s) on signs, ads, or any other media.

FIG. 3b is a flowchart illustrating one embodiment of use of a brand text keyword and sub-keyword. Continuing with the example process from above, in this process the consumer views (or sees) 35 the brand text keyword and sub keyword and texts 36 both to a short code, e.g., 74747, through the mobile phone 9. The mobile customer interactions web server 3 receives 37 the text (as a single string) and the mobile phone number and the application 4 and at least temporarily stores them. The mobile customer interactions application 4 parses 38 the keyword and sub keyword and determines 39 whether the keyword exists. If it does not exist in the database 5, the application 4 generates 50 an error message that is transmitted to the mobile phone 9. If the keyword does exist in the database 5, the process determines 40 whether the sub-keyword exists. Again, if it does not exist in the database 5, the application 4 generates 50 an error message that is transmitted to the mobile phone 9. If the sub-keyword does exist in the database 5, the application 4 retrieves 41 and prepares to transmit a response to the mobile phone 9 with the defined text response for the sub-keywords as stored in the database 5.

The application 4 at this time may be configured to store 42 the phone number in the database and associates that phone number with the sub-keyword and hidden tags. The application 4 determines 43 if the phone number is associated as a subscriber to the keyword. If so, the response gets sent to the mobile phone 9. If not, the response is sent 44 to the mobile phone 9 along with a keyword specific opt-in message. The application 4 may receive 45 an affirmative opt in, which would result in the phone number being long term stored in the database 5 or if there is a negative response to the opt in the application 4 may delete the phone number from the database 5.

Turning next to FIG. 3c, a flowchart illustrates one embodiment of a process for merchants to send segment specific messages to targeted subscribers once subscribers have opted in. Specifically, the merchant decides 46 to send segment specific messages to selected subscribers that have previously opted in. The merchant selects 47 a subset of the subscribers that previously texted a particular sub-keyword or have a segment tag associates associated with a sub-keyword. The application 4 of the mobile customer interactions system retrieves 48 the set of phone numbers from the database 5 that fits the selection criteria as identified by the merchant. The merchant can create 49 a customized message for the specific text through a web interface of the application 4. Once ready, the web application 4 sends (or transmits) 50 the message only to the subset of subscriber phone numbers that were retrieved for the identified criteria. The consumers receive 51 messages only for topics or areas for which they indicated interest and opted in.

In the process illustrated through FIGS. 3a-3c, consider the example provided previously with the jeans in which the promotion is part of a text to win context (e.g., marketed as Text2Win). If the text-to-win contest describes a prize that falls in the category of young women's jeans, the merchant will present advertising in some media that permits a consumer to view text "<keyword> win dkny" to 74747. The tags in the mobile consumer interactions system for this particular contest may tag these consumers that text in with the keyword and sub-keyword with "young women" and "jeans" tags. It is noted that future promotions, e.g., another text-to-win, also may have the same "young women" tag. When the merchant seeks to target consumers in the segment of young women and jeans in a subsequent promotion, the merchant queries the application 4 to retrieve the specific customers that participated in the prior jeans related events and that opted in for future targeted messages. The merchant creates the new promotion and a message and transmits the message to those consumers that opted to receive such messages.

In one embodiment, every time a phone texts a keyword sequence, the mobile customer interactions database application 4 associates and stores in the database 5 the phone number and the brand text keyword as well as brand text sub-keywords that were texted by that phone. Separately, the mobile customer interactions application 4 maintains a list of consumers that subscribe to particular brand text keywords. The customers that subscribe, i.e., "opt-in", receive messages from the merchant. The merchant can send periodic promotions and marketing messages to consumers that have subscribed to merchants brand text keyword. Each additional sub-keyword further segments (or creates a sub-segment of) the set of consumers addressed by the earlier keyword/sub-keyword sequence. For example, text "localchain store 1 crackers" to see the deals on 'crackers' in Store 1 of the "Local Chain" company. When the consumer texts this string from a mobile phone, the consumer mobile phone number gets tagged as interested in 'store1' as well as 'crackers'.

Merchants can retrieve sub-lists consumers who texted a particular sub-keyword and send specifically targeted messages to the sub-lists associated with each sub-keyword. The list of consumer phone numbers is not exposed to the merchant, hence protecting the privacy of the consumers. The sub-keywords segment consumer interests to better target relevant messages for that consumer. Further, once particular segments of interests are known, the auto-response for consumers could be different depending on the segments that they fall in. In addition, the segments associated with a customer phone can be used to influence how other promotions on the system respond to the same consumer phone number.

It is noted that in one embodiment, the system may be configured to provide a merchant with control over use of SMS based coupons. Specifically, SMS text messages can be forwarded. It may be desirable to control such activity from a merchant perspective. The merchant may seek control over distribution of a number of coupons to ensure that no more than an actual number of coupons distributed are redeemed. The mobile customer interactions system incorporates a mechanism that detects forwarding of text messages without exposing the mobile phone number. Specifically, the mobile customer interactions system enables the incorporation of an n-digit/n-letter random code that can be added on any generated published text message. The code is unique within a particular merchant account. Thus, no two or more consumers interacting with the same merchant on the mobile customer interactions system get the same code.

To integrate the unique number, when the promotion is established, the merchant is given an option to add a unique random code to each "valuable" message that is generated by the system. The mobile customer interactions system tracks all the codes that have been sent on any promotion for one merchant and ensures that the same code never gets generated twice. The merchant gets the ability to see the unique codes that will be getting sent even before these messages are generated. The merchant can either pre-print and use the list of codes at a point of sale system to manually invalidate each code once it is presented at the register or the merchant may pre-program the codes into the point of sale terminal system to electronically monitor redeemed codes at time of sale.

Referral Rewards Process

In some embodiments, the system can be configured to permit merchants to create incentives including those in the form of coupons in return for customers referring or recommending other customers through the mobile customer interaction system. A consumer can refer another consumer via SMS message. Each store can have a unique code that was assigned to that merchant. The referral instructions for the customers can be communicated by any communications medium, for example, print, rich media, or SMS. For example, the merchant may run a promotion noting "Win a prize by referring 5 of your friends to our store. How? Send text commands like this to the mobile customer interaction system short code: refer [friend's phone number] [storeBrand Text keyword], e.g., refer 4085551212 wgfroyo".

Referring a new customer creates a coupon for the new customer that was referred. The referred person gets a message such as "A friend thinks you will like our store. Get a 50% discount off your first visit. Text e23r to 74747 to claim your coupon." In order to actually receive the coupon, the recipient of the referral has to text a unique code to the mobile customer interactions system short code to get the coupon. The mobile customer interactions system tracks activity corresponding to a claim for the referral coupon. The referrer receives a reward only if the recipient actually performs the action to claim the coupon via SMS. Referrals in this model may have higher probability of success because recipients are likely to consider the referrals to be from a relevant source rather than a "spam" type message.

In this configuration, rewards could be of two types for the referrer: one for referring and one more if the person referred actually uses that merchant's service. The relevance of referrals may also be integrated into this model. For example, if after ten referrals by a first person, the referred consumers are not retrieving the coupons then the first person may be categorized as a spammer of particular phone numbers, which may result in a reduction of points or blocks of future referrals. It is noted that although the referral mechanism is SMS, the coupons may be distributed by any medium, for example, paper, SMS (text messages) or Web pages viewable through a mobile phone. Thus, the system is configured to permit merchants to create incentives in return for customers referring or recommending through an SMS message other customers through the mobile customer interactions system.

Figure 4:
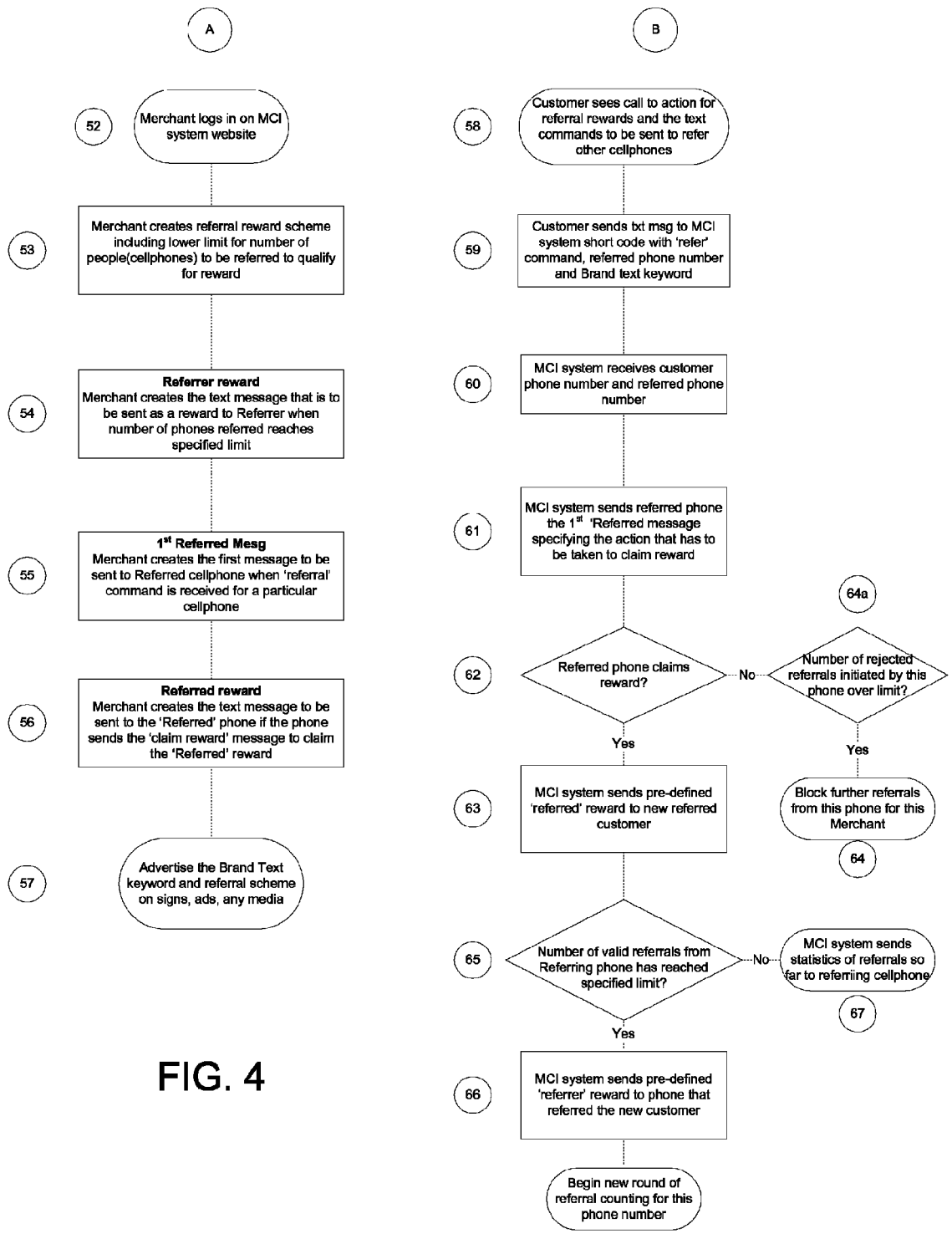
FIGS. 4a and 4b are flowcharts that illustrate an example embodiment for creation of a referral rewards process through a text messaging system and application of the referral rewards process leveraged through a text messaging system.

FIGS. 4a and 4b are flowcharts that illustrate an example embodiment for creation of a referral rewards process through a text messaging system and application of the referral rewards process leveraged through a text messaging system. Referring first to FIG. 4a, to set up a referral program over text messaging, the merchant logs 52 into the mobile consumer interactions system and accesses the application 4. Through the application 4, the merchant creates 53 a referral scheme that includes a minimum number of mobile phone numbers that have to be referred in order to qualify for the referral reward. The merchant can also specify whether the referred phone numbers need to claim the reward or not, in order for the referrer to claim the referral counts as a valid referral towards a reward. If the need to "claim" the reward is enforced, it reduces "spam" referrals to people who would not be interested.

The merchant through the process creates 54 the actual referrer reward text message that is sent to the referrers once a specified minimum limit of new mobile numbers is received. The merchant also creates 55 a first referred message that is sent to each referral recipient to induce the recipient to claim the discount once they receive the message. Through the process the merchant creates 56 the actual referred reward message that the recipient receives if the recipient shows interest in claiming the reward by texting back. It is noted that to further augment the process, the brand text keywords and referral schema may be advertised through media such as print or electronic media, including SMS text and rich media.

FIG. 4b illustrates one example embodiment for a process with consumers leveraging the referral process. A consumer phone 9 refers a mobile phone number of a friend, transmitting 58, 59 a message such as: "refer 4085553333 wgfroyo," where 4085553333 is the friend's phone number and where 'wgfroyo' is the brand text keyword. When the mobile customer interactions system receives 60 the message, the system sends 61 the referred phone number the first referred message that was defined earlier by the merchant. The application 4 in the mobile customer interactions system determines 62 if the referred phone number claims the reward or ignores the message (potential spam referral).

If the referred phone number ignores the message, the application 4 determines 64a if the number of such ignored or unclaimed referral messages initiated by the consumer exceeds a defined number. If so, the application 4 blocks 64 the phone number sending referrals from providing further referrals.

If the referred phone does claim the reward, the application identifies it as a valid referral. The application 4 in the mobile customer interactions system sends 63 the 'referred' reward previously defined by the merchant to the new referred phone. The application 4 determines 65 if the number of valid referrals from the referring phone has reached a specified threshold, where this threshold was previously defined by the merchant 1. The number of valid referrals is stored in database 5. If the threshold has been reached, the application 4 sends 66 the previously defined 'referrer' reward to the consumer phone 9. If the threshold has not been reached, the application 4 sends 67 current statistics of referrals to the referring phone.

Loyalty Rewards Process

In some embodiments, the system can be configured to permit merchants to create a loyalty program where the customer can record transactions through SMS messages and receive rewards as a result of the transactions. For example, after five transactions at a store that are recorded by the customer through the mobile customer interactions system, the customer receives a particular reward from the system via a SMS message.

The application 4 in the mobile customer interaction system generates a random text code that is sent daily (or with some other frequency) as a text message to the merchant's phone. The merchant 1 enters this code each day into the cash register so that the code is printed on every receipt for that day. The customers who buy services or products from the merchant that day read a message on the receipt and can send the code along with the brand text keyword to the short code 8 of the mobile customer interaction system as a text message. The system processes messages from the customers 9 and generates rewards according to the rules defined earlier by the merchant 1. For example, each message can generate loyalty points for the customer that can be redeemed for rewards. The rewards can be provided through text messages sent to the customer, including text message coupons. Using the Mobile Customer Interaction system, a merchant 1 can create a loyalty program that is run over SMS, avoiding paper.

Figure 5:
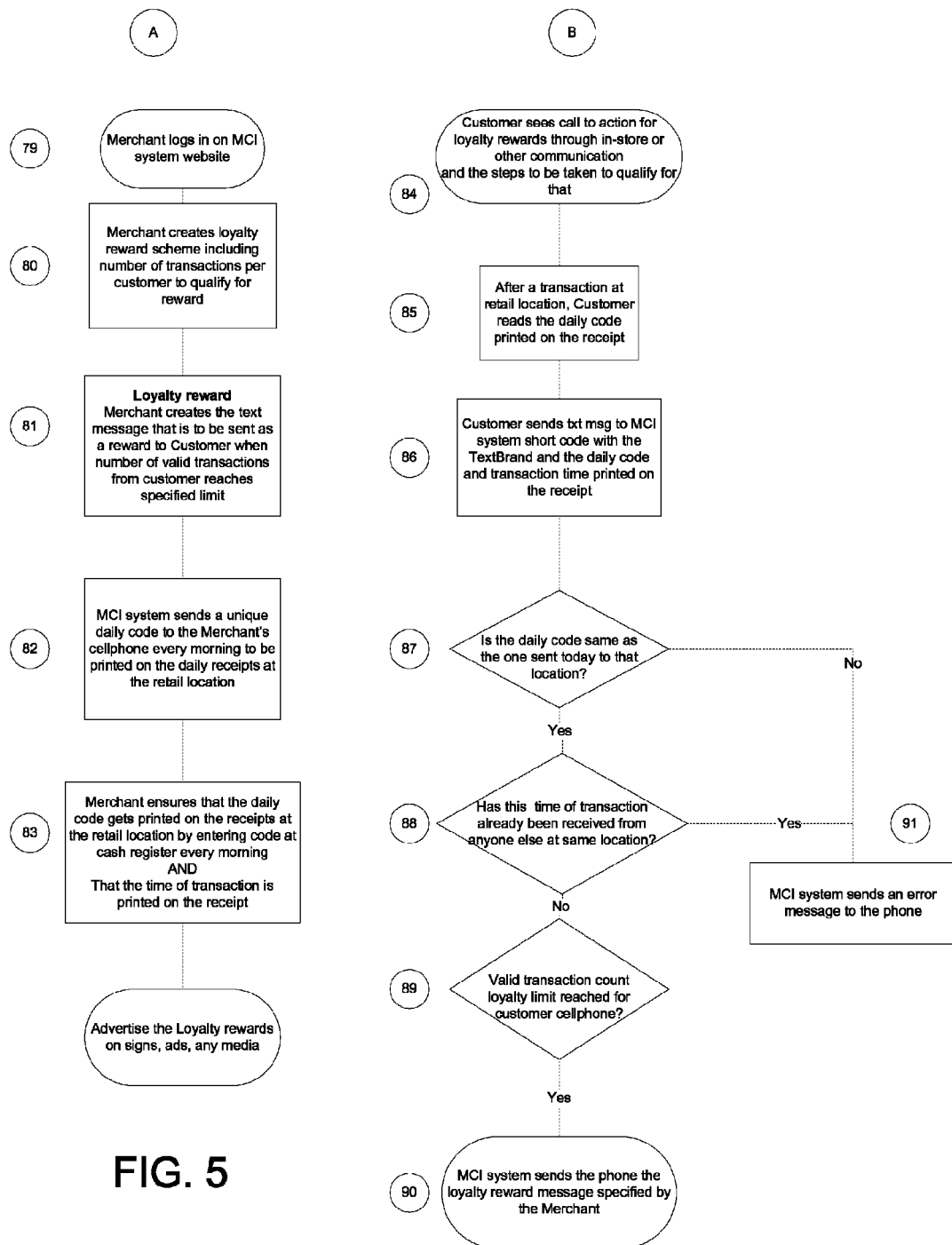
FIGS. 5a and 5b are flowcharts that illustrate an example embodiment for creation of a loyalty rewards process through a text messaging system and application of the loyalty rewards process leveraged through a text messaging system.

FIGS. 5a and 5b are flowcharts that illustrate an example embodiment for creation of a loyalty rewards process through a text messaging system and application of the loyalty rewards process leveraged through a text messaging system. Referring first to FIG. 5a, to set up a loyalty rewards scheme over text messaging, the merchant logs 79 into the mobile consumer interactions system and accesses the application 4. The merchant creates 80 a loyalty reward scheme including the number of transactions per customer to qualify for a reward. The merchant then creates 81 the text message that is to be sent as a reward to the customer when the number of valid transactions from the customer reaches the specified limit. This text message can be a coupon that enables the customer to get the reward at a retail location.

The mobile customer interaction system sends 82 a unique daily code via SMS message to the merchant 1 every morning to be printed on the receipts at the retail location that day. This can be a randomly generated text code that the merchant enters into the register. The merchant 1 configures 83 the register to print the daily code and the time of the transaction on customer receipts. The register can be configured to only print the code on receipts where the transaction amount is greater than a predetermined minimum amount. The merchant 1 then advertises to customers the loyalty rewards scheme via signs, advertisements, or any media.

FIG. 5b illustrates one example embodiment for a process with customers leveraging the loyalty rewards process. A customer who buys services or products from a merchant 1 and sees 84 a call to action for loyalty rewards reads 85 the message on the receipt and is instructed to send a text, message to the short code of the mobile customer interaction system. The content of the text message is a text brand keyword followed by a 'loyalty' word formed by joining the daily code and the time of transaction. The time of transaction can be in 'hhmm' format, where hh is the hour (range of 00-23) and mm is the minute (range of 00-59). The customer is instructed that the message must be sent today. The customer follows the instructions and sends 86 a text message with this content to the mobile customer interaction system.

The application 4 of the mobile customer interaction system receives the message and parses the 'loyalty' word after the "Brand Text keyword" to determine the daily code and the transaction time. The application 4 determines 87 if the daily code is the same as the one sent today to the merchant associated with the "Brand Text keyword." If the daily code is not the same as the one sent today to that merchant, the application 4 sends 91 an SMS error message to the customer phone 9. If the daily code is the same, the application 4 determines 88 whether the transaction time contained in the message has already been used in another message received with the same daily code. If so, then the transaction time is invalid and the application 4 sends an error message via SMS to the customer. If not, then the transaction is considered a valid transaction that qualifies for a loyalty reward. The application 4 counts all such valid transaction messages from the customers and generates rewards according to rules defined earlier by the merchant through the application. The application 4 determines 89 if the valid transaction count for a customer has reached the loyalty limit, where the loyalty limit is a previously defined number of transactions needed to qualify for a reward. If the limit has been reached, the application 4 sends 90 the customer phone 9 the loyalty reward message specified by the merchant via SMS.

Demand Aggregation

In some embodiments, the system can be configured to aggregate requests from customers to provide merchants with an indication of customer demand. Customers can search for merchants via SMS messages sent to the mobile customer interaction system short code and receive results via SMS. As part of the results, the customer sees a short (e.g., 4 letter) code from the merchant 1 which the customer can send back to the system short code module 8 to check if that merchant 1 has coupons. If there is a coupon created by the merchant 1 on the system, the customer receives that merchant's coupon via SMS.

If there is no coupon for the requested merchant 1, a subscription request is sent to the customer phone 9. The customer is informed that there is no coupon, but is asked to subscribe so that he or she will be informed when a coupon becomes available from the merchant. The mobile customer interaction system aggregates all such requests from these customers and coverts them to SMS subscribers for the merchant. The customer's coupon request event can cause the mobile customer interaction system to generate two messages: (1) An SMS customer aggregation message for the requested merchant (sent to the customer's phone 9), and (2) a separate incentive message to the customer so that they are incentivized to show the message at the merchant location. This incentive can be monetary to encourage the customer to show the message to the merchant and cause the merchant to enroll on the mobile customer interaction system.

At the merchant location, the customer (or a salesperson) can show a SMS customer aggregation message generated by the mobile customer interaction system and sent to the phone, providing the statistics of potential customers and subscribers signed up so far on the system for this merchant. The same message has a discount code for the merchant offering, for example, three months free usage on the mobile customer interaction system. These discount codes are unique for a merchant and phone combination. The system can track which customer's phone caused a merchant to sign up for the free trial. The customer that showed the message to the merchant who signed up for the free trial can be rewarded in various ways, including a monetary reward. The number of 'potential customers' signed on the mobile customer interactions system can be used as an incentive to get the merchant to sign up on the system.

Figure 6:
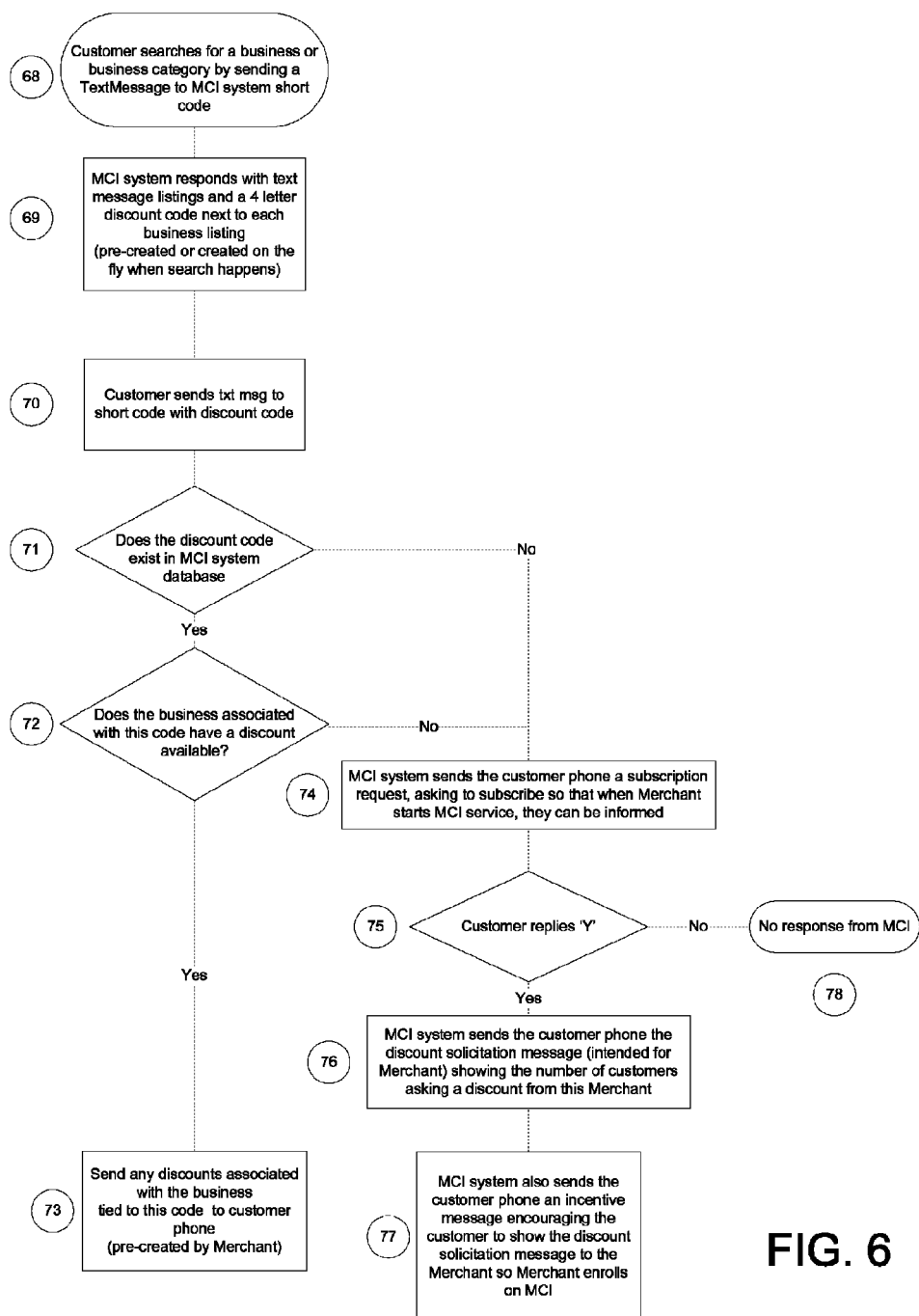
FIG. 6 is a flowchart that illustrates an example embodiment for a demand aggregation process through a text messaging system.

FIG. 6 is a flowchart that illustrates an example embodiment for a demand aggregation process through a text messaging system. A customer can send a text message to conduct a search for a business. The search is initiated when a customer sends 68 a text message to the mobile customer interaction system short code with a set of keywords. The keywords can include a business name or a business category or other keywords that can be used to identify a business.

The application 4 of the mobile customer interaction system performs a search and responds 69 to the query with a text message list of businesses that matched the keywords. The response may span multiple text messages and may contain more than one business name. Each business name in the listing includes the name of the business, the phone number, the address or other location information, and a four letter code that the customer can use to check for discounts at the merchant. The discount code can be previously created or can be created on the fly when the search happens.

The customer then sends 70 a request text message to the mobile customer interaction system short code to check if there is a discount available at one of the listed merchants. The request text message includes the four letter discount code provided with the merchant listing by the mobile customer interaction system. When the request text message is received from the consumer phone 9, the application 4 of the system determines 71 whether the discount code exists in the database 5. The application 4 correlates the code to the consumer's previous search. If the discount code exists in the database 5, the application 4 determines 72 whether the business associated with the code has a discount available. The discount may have been previously created by the business. If the business has a discount available, the application 4 sends 73 any discounts associated with the business to the customer via SMS. The discount can be sent as a coupon with instructions for use.

If the discount code does not exist in the database 5 or if the business associated with the code does not have a discount available, the application 4 of the mobile customer interaction system sends 74 the customer an SMS subscription request asking the customer to subscribe so that the customer can be notified when the merchant starts mobile customer interaction service. By subscribing, or opting-in, the customer is notified when the merchant signs up or creates a discount coupon. The application 4 receives the response from the customer to the subscription request and determines 75 whether the response is yes or no.

If the response is yes, the application 4 sends 76 the customer an SMS discount solicitation message showing the number of customers asking for a discount from this merchant. The solicitation message is an "on demand" coupon that indicates the number of consumers who are interested in the merchant's business. The "on demand" coupon is created by the application 4 even though the merchant has neither signed up on the system nor created any discount programs. The "on demand" coupon requests the merchant to give any reasonable discount to the consumer showing the text message. The "on demand" coupon also, for example, provides a complimentary month membership on the mobile customer interaction system with an included sign-up code. In addition, the merchant is also informed of the number of consumers who are interested in the merchant's business based on the number of aggregated text messages. The application also sends 77 the customer an SMS incentive message encouraging the customer to show the discount solicitation message to the merchant so that the merchant enrolls in the mobile customer interaction system.

Over a period of time the mobile customer interaction system is able to aggregate lists of merchants for whom a discount coupon was requested but none existed in the system. The aggregated list of search queries for merchants also gives leads to the system sales team of high demand merchants that should be given higher priority for getting signed up.

In one example scenario where the merchant has already created a discount code, the customer sends the message "pizza 94089" to the mobile customer interaction system short code. The application 4 in the system responds with the message "mountain pizza, 408-123-4567. Send msg c134 to check for discounts." The customer sends a message with the code c134 to the system. The application 4 responds with the message "Receive 15% off on your second pizza. Valid till Dec. $20^{th}$."

In another example scenario where the merchant is not part of the mobile customer information system, the customer sends the message "pizza 94089" to the mobile customer interaction system short code. The application 4 in the system responds with the message "mountain pizza, 408-123-4567.

Send msg c134 to check for discounts." The customer sends a message with the code c134 to the system. The application 4 responds with the incentive message "Currently no discount code exists for mountain pizza. Show the next message to the merchant for a potential discount." The application 4 also sends a discount solicitation message to the customer (intended for viewing by the merchant), "There are 16 consumers interested in your business. We request that you give a discount to this consumer. You can signup on the MCI system for 3 free months. Use code: 4daa5."

The disclosed embodiments beneficially allow for interactions between merchants and customers using SMS. With SMS, merchants can easily and rapidly send targeted messages to customers and customers can easily and rapidly provide information useful to merchants. The mobile customer interaction system enables automated SMS communications with clients and can be configured by merchants through a standard web browser. The system can provide automatic responses to customers who send text messages expressing interest in a merchant, brand, or segment. The system can provide a merchant with an indication of the demand associated with the merchant or a brand of the merchant. The system can also automatically respond to customers who send text messages referring other consumers to a merchant or customers who send text messages regarding products the customers have purchased from a merchant. As a result, merchants can maintain contact with frequent customers and encourage customer loyalty and referrals using an automated system and the immediate interactivity of text messaging.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for merchant and customer interaction using short message service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for merchants to provide rewards to consumers using short message service (SMS), comprising:
   receiving in a computer based mobile customer interaction (MCI) system a reward message and a qualifying threshold from the merchant;
   receiving in the MCI system a text message from a phone of a consumer;
   determining by the MCI system whether the text message contains a reward keyword and whether the text message contains a reward code;
   responsive to the text message containing the reward keyword and containing the reward code, determining by the MCI system whether the text message is a qualifying message;
   responsive to the text message being a qualifying message, incrementing by the MCI system a qualifying number and determining whether the qualifying number is equal to or greater than the qualifying threshold; and
   responsive to the qualifying number being equal to or greater than the qualifying threshold, sending by the MCI system a text message to the consumer containing the reward message.

2. The method of claim 1, wherein the reward keyword is a predetermined keyword for signaling a referral, and wherein the reward code is a referred phone number, and wherein determining whether the text message is a qualifying message further comprises:
   sending by the MCI system a text message containing a first referred text message to the referred phone number, the first referred text message containing instructions for claiming a reward; and
   determining by the MCI system whether the referred phone number claims the reward.

3. The method of claim 2, wherein the contents of the first referred text message are received in the MCI system from the merchant.

4. The method of claim 2, further comprising:
responsive to the referred phone number not claiming the reward and responsive to a total number of phone numbers referred by the consumer being greater than a rejected referral threshold, blocking by the MCI system further referrals from the consumer.

5. The method of claim 1, wherein the reward keyword is a brand text keyword associated with the merchant, and wherein a merchant code is a unique code known to the merchant, and wherein the merchant code is provided to the customer by the merchant when the customer performs a business transaction with the merchant, and wherein determining whether the text message is a qualifying message further comprises:
determining by the MCI system whether the reward code matches the merchant code.

6. The method of claim 5, further comprising:
generating by the MCI system a random unique merchant code for the merchant each business day; and
sending by the MCI system a text message to the merchant each business day, the text message containing the new unique merchant code.

7. The method of claim 5, wherein the text message contains a time of transaction, and wherein determining whether the text message is a qualifying message further comprises:
determining by the MCI system whether a previous text message has already been received containing the same reward code and same time of transaction.

8. The method of claim 7, wherein the reward keyword, reward code, and time of transaction are printed on a receipt provided by the merchant to the consumer.

9. A computer readable medium storing instructions thereon that when executed by a processor cause the processor to perform a method for merchants to provide rewards to consumers using short message service (SMS), the method comprising the steps of:
receiving a reward message and a qualifying threshold from the merchant;
receiving a text message from a phone of a consumer;
determining whether the text message contains a reward keyword and whether the text message contains a reward code;
responsive to the text message containing the reward keyword and containing the reward code, determining whether the text message is a qualifying message;
responsive to the text message being a qualifying message, incrementing a qualifying number and determine whether the qualifying number is equal to or greater than the qualifying threshold; and
responsive to the qualifying number being equal to or greater than the qualifying threshold, sending a text message to the consumer containing the reward message.

10. The computer readable medium of claim 9, wherein the reward keyword is a predetermined keyword for signaling a referral, and wherein the reward code is a referred phone number, and wherein determining whether the text message is a qualifying message further comprises:
sending a text message containing a first referred text message to the referred phone number, the first referred text message containing instructions for claiming a reward; and
determining whether the referred phone number claims the reward.

11. The computer readable medium of claim 10, wherein the contents of the first referred text message are received from the merchant.

12. The computer readable medium of claim 10, further comprising:
responsive to the referred phone number not claiming the reward and responsive to a total number of phone numbers referred by the consumer being greater than a rejected referral threshold, blocking further referrals from the consumer.

13. The computer readable medium of claim 9, wherein the reward keyword is a brand text keyword associated with the merchant, and wherein a merchant code is a unique code known to the merchant, and wherein the merchant code is provided to the customer by the merchant when the customer performs a business transaction with the merchant, and wherein determining whether the text message is a qualifying message further comprises:
determining whether the reward code matches the merchant code.

14. The computer readable medium of claim 13, further comprising
generating a random unique merchant code for the merchant each business day; and
sending a text message to the merchant each business day, the text message containing the new unique merchant code.

15. The computer readable medium of claim 13, wherein the text message contains a time of transaction, and wherein determining whether the text message is a qualifying message further comprises:
determining whether a previous text message has already been received containing the same reward code and same time of transaction.

16. The computer readable medium of claim 15, wherein the reward keyword, reward code, and time of transaction are printed on a receipt provided by the merchant to the consumer.

17. A computer system for merchants to provide rewards to consumers using short message service (SMS), the computer system comprising:
a memory;
a computer program, stored in said memory, that when executed by the computer system enables the functioning of:
a module for receiving a reward message and a qualifying threshold from the merchant;
a module for receiving a text message from a phone of a consumer;
a module for determining whether the text message contains a reward keyword and whether the text message contains a reward code;
a module for, responsive to the text message containing the reward keyword and containing the reward code, determining whether the text message is a qualifying message;
a module for, responsive to the text message being a qualifying message, incrementing a qualifying number and determining whether the qualifying number is equal to or greater than the qualifying threshold; and
a module for, responsive to the qualifying number being equal to or greater than the qualifying threshold, sending a text message to the consumer containing the reward message.

18. The system of claim 17, wherein the reward keyword is a predetermined keyword for signaling a referral, and wherein the reward code is a referred phone number, and wherein determining whether the text message is a qualifying message further comprises:

a text message containing a first referred text message sent to the referred phone number, the first referred text message containing instructions for claiming a reward; and a module for determining whether the referred phone number claims the reward.

19. The system of claim 18, wherein the contents of the first referred text message are received from the merchant.

20. The system of claim 18, further comprising:

a module for, responsive to the referred phone number not claiming the reward and responsive to a total number of phone numbers referred by the consumer being greater than a rejected referral threshold, blocking further referrals from the consumer.

21. The system of claim 17, wherein the reward keyword is a brand text keyword associated with the merchant, and wherein a merchant code is a unique code known to the merchant, and wherein the merchant code is provided to the customer by the merchant when the customer performs a business transaction with the merchant, and wherein determining whether the text message is a qualifying message further comprises:

a module for determining whether the reward code matches the merchant code.

22. The system of claim 21, further comprising:

a module for generating a random unique merchant code for the merchant each business day; and a module for sending a text message to the merchant each business day, the text message containing the new unique merchant code.

23. The system of claim 21, wherein the text message contains a time of transaction, and wherein determining whether the text message is a qualifying message further comprises:

a module for determining whether a previous text message has already been received containing the same reward code and same time of transaction.

24. The system of claim 23, wherein the reward keyword, reward code, and time of transaction are printed on a receipt provided by the merchant to the consumer.

* * * * *